Figure 5:
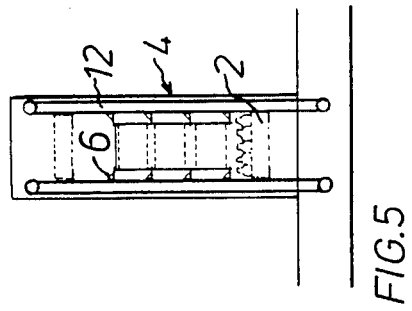

United States Patent [19]

Berghäll et al.

[11] Patent Number: 4,621,969
[45] Date of Patent: Nov. 11, 1986

[54] METHOD AND APPARATUS FOR LOADING AND UNLOADING A STORAGE AND TRANSPORT RACK

[75] Inventors: Christer K. Berghäll, Järvenpää; Jukka S. Ollikainen, Helsinki; Timo T. Koskivaara, Järvenpää, all of Finland

[73] Assignee: Valpak Oy, Järvenpää, Finland

[21] Appl. No.: 619,153

[22] PCT Filed: Oct. 12, 1983

[86] PCT No.: PCT/FI83/00063
§ 371 Date: Jun. 7, 1984
§ 102(e) Date: Jun. 7, 1984

[87] PCT Pub. No.: WO84/01561
PCT Pub. Date: Apr. 26, 1984

[30] Foreign Application Priority Data

Oct. 12, 1982 [FI] Finland ................................ 823467

[51] Int. Cl.⁴ .......................... B65G 1/00; B65G 67/02
[52] U.S. Cl. ........................ 414/331; 53/246; 53/247; 53/539; 198/422; 414/29; 414/400; 414/786
[58] Field of Search ............... 414/331, 395, 396, 400, 414/786, 29, 46, 89; 198/422, 431; 53/246, 247, 539

[56] References Cited

U.S. PATENT DOCUMENTS

| | | | |
|---|---|---|---|
| 1,759,005 | 5/1930 | Fuller | 414/331 |
| 1,779,210 | 10/1930 | Davis | 414/331 |
| 2,718,972 | 9/1955 | Temple | 414/331 X |
| 3,160,295 | 12/1964 | Roark | 414/331 |

Primary Examiner—Joseph E. Valenza
Assistant Examiner—David A. Bucci

[57] ABSTRACT

A method and apparatus for loading and unloading a transport and storage rack, such as a cart-rack (9). Packages (2) of goods, arriving on a conveyor (3), are directed to the appropriate support plates (6) of an intermediate storage (4) equipped with a lifting and lowering device, the plates being situated at a distance from each other corresponding to the distance between the shelves in the cart-rack (9), in which case a number of goods packages corresponding to the number of shelves in the rack are transferred simultaneously into the rack by means of a separate pushing device (5), the several pushers (11) of this device carrying out the transfer. The rack (9) is unloaded by pushing by means of a pusher (5) all the goods packages (2) in it simultaneously into the intermediate storage (4) and from there one at the time onto the conveyor (3). At this time the conveying direction of the lifting device is opposite to the loading procedure. The intermediate storage (4) can be loaded with a complete formation of goods, and respectvely emptied, while the loaded, respectively unloaded, cart-rack (9) is being replaced.

2 Claims, 7 Drawing Figures

U.S. Patent Nov. 11, 1986 Sheet 1 of 3 4,621,969

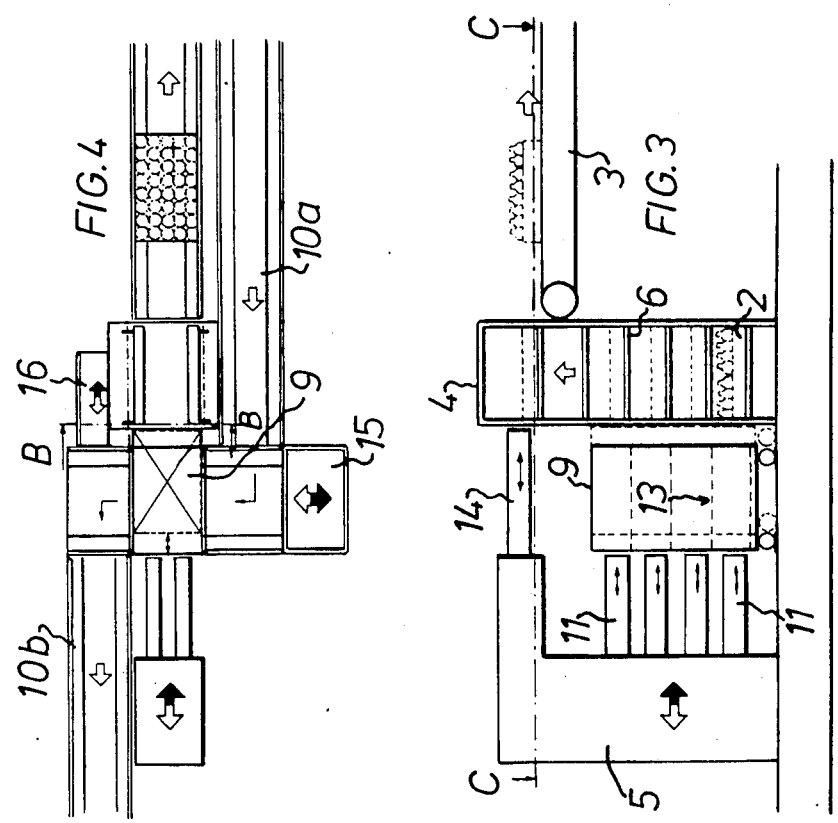

METHOD AND APPARATUS FOR LOADING AND UNLOADING A STORAGE AND TRANSPORT RACK

The present invention relates to a method for loading with several layers of goods a storage and transport rack, and respectively for unloading it, wherein goods which arrive on a conveyor are transferred during loading into a rack, for example a cart-rack, and respectively, during unloading, the goods are transferred from it, the rack being fixed to a predetermined station for the duration of the loading or the unloading. The invention also relates to an apparatus for carrying out this method.

There are known apparatus by means of which a cart-rack, for example one for milk cartons, can be loaded in such a way that a quantity of milk cartons which fit on one storage level of the rack and are situated on a suitable flat support or are placed in a separate package are transferred to the storage level by pushing by means of, for example, a hydraulic cylinder. By adjusting either the height position of the rack or the height position of the level on which the goods arrive and from which they are pushed into the rack, the different levels of the rack can be loaded. Thereafter the loaded rack can be rolled away and a new cart-rack can be brought in its place. In the system in question, however, a considerable number of stoppages are caused because the replacing of the cart-rack takes its time and the rest of the system is idle during that time. In addition, applying such a system also to unloading is difficult.

The object of the present invention is to provide a method and apparatus by means of which the above-mentioned problems can be overcome and by means of which not only the loading of a storage and transport rack but also its unloading can be achieved in a manner optimized with respect to the use of time.

For this purpose the invention applies an intermediate storage device which is equipped with a vertical transfer device for receiving the goods in layers and from which then the entire formation of goods can be pushed into the rack at one time. A vertical transfer device of this type is prior known from, for example DE patent application No. 2,131,179. It utilizes in connection with the storage of goods a lifting device moving on rails, in which the layers of goods are stacked one on top of the other and which can then place the entire formation into the appropriate storage rack, or respectively take a formation out of the rack. What is concerned in the present invention is a stationary intermediate storage which can be loaded, or respectively unloaded, while the loaded, or respectively unloaded, rack is being replaced.

The method and apparatus according to the invention are characterized in that the goods are transferred from an intermediate storage by horizontally movable plate-like members that are being pushed in one push, but slightly staggered so that the lowest layer of goods is transferred into the shelf-less rack first.

Figure 2:
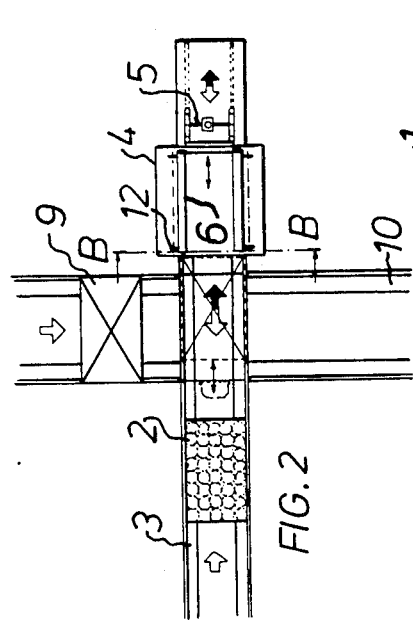
Figure 1:
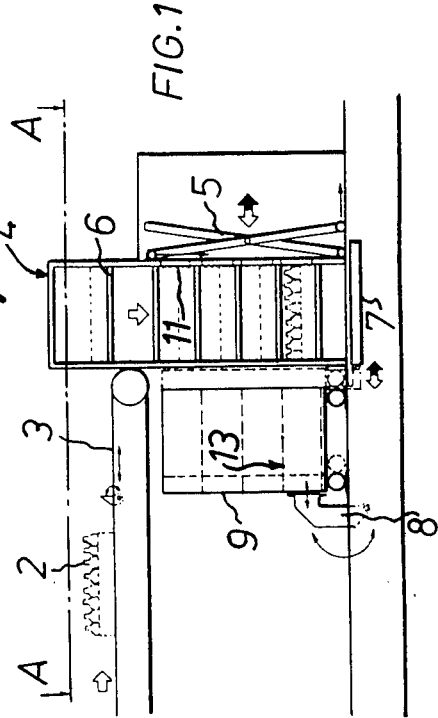
Figure 6:
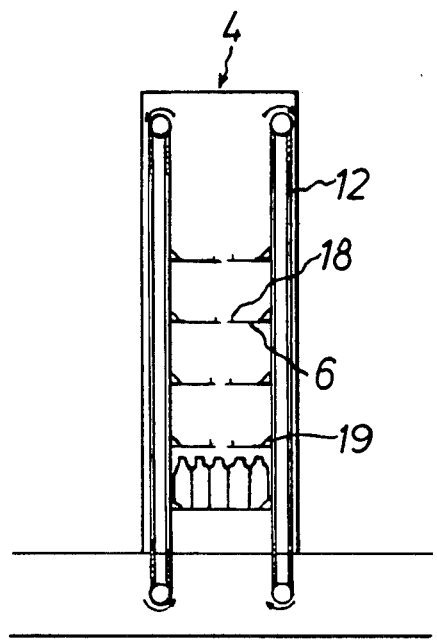
Figure 7:
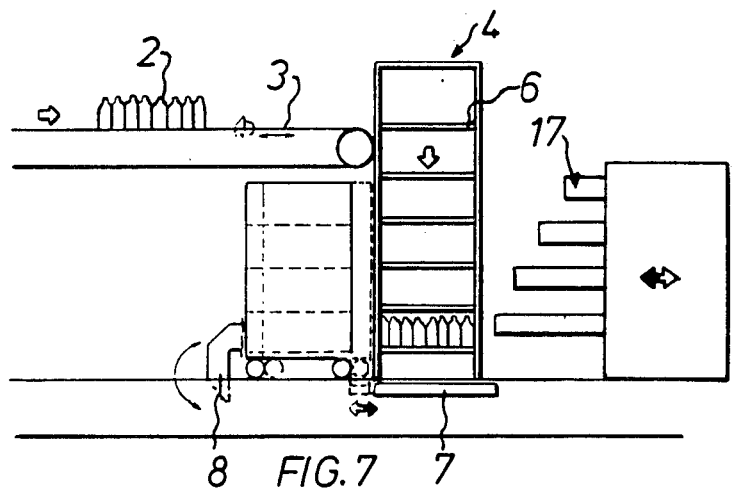

The invention is described below in greater detail with reference to the accompanying patent drawings, in which FIG. 1 depicts a simplified side view of an apparatus according to the invention, FIG. 2 depicts the same apparatus in section A—A of FIG. 1, FIG. 3 depicts an apparatus according to the invention specifically applied to the unloading of a cart-rack, FIG. 4 depicts the apparatus according to FIG. 3 in section C—C of FIG. 3, FIG. 5 depicts section B—B of the intermediate storage apparatus seen in FIGS. 2 and 4, FIG. 6 depicts an intermediate storage apparatus for goods which are not in packages, and FIG. 7 depicts the loading stage for such goods, corresponding to FIG. 1.

FIG. 1 depicts an apparatus 1 in which the goods to be loaded, in this case bottles 2 packed into a group, arrive at the loading site on a conveyor 3. The cart-racks 9 to be loaded arrive at the site on a conveyor 10 and stop at the loading place. In the immediate vicinity of the conveyor 3 there is an intermediate storage 4, and those edges of it which are parallel to the travel direction of the conveyor 3 have endless conveyor chains 12, which serve as lifting/lowering devices and in which there are fitted at even intervals by angle supports 19, for instance, plates 6 which serve as means for receiving the package of goods. There are plates 6 with conveyor chains 12 on both sides of the intermediate storage 4, their movements being, of course, mutually synchronized, in order that the package remain in a substantially horizontal position throughout the operation.

The packages coming from the conveyor 3 are transferred into the intermediate storage 4 in such a way that each pair of plates 6 receives its own package of goods. At this time the chains move downwards in sequences in such a way that each of the spaces between the plates seen in FIG. 1 has a package of goods, the distance between the plates corresponding to the distance between the shelves in the cart-rack 9.

The cart-rack is waiting for its load next to the intermediate storage 4, and the pushing device 5 carries out a reciprocating movement and pushes, by means of its pusher 11, in this case four packages 2 one on top of the other onto the shelves 13 respectively spaced in the rack. This transfer has been preceded by a transfer of the rack 9 by member 8 to immediately next to the intermediate storage 4. During the transfer the member 8 supports the cart-rack 9 so that it cannot move when the force of the push affects it. The entire transfer of the packages into the rack takes only the time that it takes for the next package to be transferred to the top space in the intermediate storage 4. Thereafter the cart-rack can be moved away by conveyor means 7 and be replaced with the next rack 9, which arrives on the conveyor 10 while the intermediate storage 4 is being filled.

In the event that the functions of the apparatus depicted in FIGS. 1 and 2 are altered in a certain way and the order of the devices is changed, the system can be caused to function as an unloading apparatus.

Such an apparatus is depicted in FIGS. 3 and 4 as an embodiment in which the unloading direction is depicted as being opposite to the loading direction. The intermediate storage 4 is exactly the same device as described above, even though its conveying direction is now upward instead of downward, as it is when loading the rack. The arrangement of the rack 9 is also identical to the previous one. The pushing device 5 is now depicted in a form somewhat deviating from the previous one, but the pushers 11 operate in the same manner as above. Thus they push all the packages from the rack simultaneously into the device 4. In addition, the pushing device has a separate arm 14, which pushes the package which is at the level of the conveyor 3 onto the conveyor 3, which carries it away. FIG. 4 depicts an arrangement of a cart-rack track 10 deviating from the embodiment of FIG. 2. The arriving branch 10a and the departing branch 10b of the conveyor 10 are substantially parallel. This is significant in terms of the adaptability of the apparatus, for depending on the space available it may be necessary to place the track in different ways.

The fact that the conveyor 10 has two curves is significant also for the reason that in this case it is necessary to have two separate new pushers 15 and 16 to aid the transfer of the cart-racks to the unloading place and away from it. The said pushers and especially the arrival-side pusher 15 can also be used for precise placing of the rack at its unloading station. It is quite clear that the conveyor 10 can curve in any direction, in which case the angle between the arriving conveyor section 10a and the departing section 10b can be 0°, 90° or 180°.

FIG. 5 depicts cross section B—B of the lifting and lowering device 4. The figure clearly shows the placement of the chains 12 or respective devices in the apparatus and the location of the plates 6 in the chains 12.

Pushing devices 5, 14, 15 and 16 can be pneumatic, hydraulic or, for example, electromechanical devices, for any known operating method is sufficient, since reliability in operation is nearly the only criterion in the selection of the operating method. Sufficient speed is achieved by any operating method. The mutual location of the parts of the apparatus can be different from that presented by way of example in the figures. Thus, the conveyor arrangement 10 for the loading of the cart-racks 9 can be the same as is used in, for example, FIG. 4, for the straightness of the conveyor 10 is not a condition for successful operation.

By using the method and apparatus according to the invention, it has been possible to make both operations continuous. There will be no stoppages, and so the loading and unloading of cart-racks or similar storage and transport racks is rapid as compared with previous methods, which is an absolute requirement in modern industry. Since the capacity of the apparatus is considerably higher than that of known apparatus, it is possible with the aid of the apparatus according to the invention to achieve savings also in acquisitions of apparatus, since the total number of apparatus units per factory unit can be decreased.

The apparatus according to the invention is highly suitable for use also in such a way that the goods, such as cartons or bottles, are not packed in packages, but they arrive on conveyor 3 separate, in a so-called "loose package". Such a "loose package" thus otherwise fully corresponds to the quantity of goods packed in a box, but there is no package around the goods. In such a case the plates 6 of the lifting and lowering device are designed so that they form a substantially level surface for the goods. Thus the plates 6 have been widened in such a way that the plates 6 extend on both sides the device 4 substantially half way into the device 4 up to a stop 18. In other respects the apparatus fully corresponds to the apparatus described above.

Above, an apparatus was described in which the cart-rack 9 is equipped with shelves 13 onto which the packages of goods or the goods are transferred in layers. It is, however, fully possible also to use a rack without shelves. It is evident that the goods to be stacked in the cart-rack 9 must in such a case be capable of being stacked one above the otner, i.e. they must be of such a kind that the upper surface of each layer of goods can serve as the receiving surface of the next layer of goods in the event that a "loose package" is used. If there are no shelves, the plates 6 of the intermediate storage 4 are used for transferring the goods from the intermediate storage 4 into the rack 9. Such an arrangement is shown in FIG. 7. The plates 6 extend on both sides substantially so as to come into contact with each other, and the "loose package" made up of the goods, supported by the plates 6, is transferred into the cart-rack, whereafter a stop 18 on the intermediate storage 4 side holds the goods in place while the plates 6 are being drawn back.

When an embodiment is used in which the plates 6 of the intermediate storage can be transferred into the rack and away from it, and thus the transfer is by means of plates 6 into a rack without shelves, the transfer must be staggered, since the package or separate goods to be transferred into the rack must, of course, have a receiving base ready at least in part before the next layer can be transferred into place. Such staggering is shown in FIG. 7. In it the lowest plates 6 are carrying out their transfer movement with the aid of pushers 17 somewhat ahead of the next plate pair 6, which again carries out its movement slightly ahead of the next one, etc. The difference between the stages need not be great, but should be great enough for a suitable receiving base to have been formed at each given time for the next layer of goods.

We claim:

1. A method of loading a shelf-less storage and transport rack at predetermined station with several layers of goods, comprising the steps of: bringing in the goods in one layer on a conveyor, arranging next to said station an intermediate storage means having a plurality of horizontally movable plate-like members for supporting the layers respectively in said intermediate storage means, transferring said plate-like members and the goods thereon in vertical direction into a formation corresponding to the formation of goods in the rack, and pushing the plate-like members and the goods thereon from the intermediate storage means in one push into the shelf-less rack in staggered fashion so that the lowest layer is partially pushed into the rack first, and layers thereabove are pushed, staggered in succession, into a vertically aligned formation in the rack.

2. An apparatus for loading a storage and transport rack with several layers of goods, comprising: a conveyor for bringing in the goods in one layer, a shelf-less storage and transport rack for the goods, and rack being movable and lockable at a predetermined station for the loading of the goods, intermediate storage means arranged next to said station, and having horizontally movable plate-like members for supporting the respective layers of goods in said intermediate storage means, vertical transfer devices for transferring said plate-like members and the goods thereon in vertical direction into a formation corresponding to the formation of goods in the rack, and a multiple-layer pushing device arranged next to said intermediate storage means for pushing the goods from the intermediate storate means into said shelf-less rack, said pushing device comprising separate, vertically spaced pushers for the respective layers of goods, and means for moving said pushers in staggered fashion so that each pusher is moved in succession ahead of the pusher above the same but to the same extent, to thereby move the goods into a vertically aligned formation in the shelf-less rack.

* * * * *